United States Patent [19]

Sarson

[11] Patent Number: 4,541,088
[45] Date of Patent: Sep. 10, 1985

[54] TONE GENERATION CIRCUIT FOR AUTOMATIC PCM-TDM TELECOMMUNICATION EXCHANGE

[75] Inventor: Gary A. Sarson, Ottawa, Canada

[73] Assignee: Standard Telephones and Cables, PLC, London, England

[21] Appl. No.: 539,410

[22] Filed: Oct. 6, 1983

[30] Foreign Application Priority Data

Oct. 8, 1982 [GB] United Kingdom ............... 8228845

[51] Int. Cl.³ ........................ H04J 3/12; H04Q 11/04
[52] U.S. Cl. .................................. 370/110.2; 370/67
[58] Field of Search ................ 370/110.2, 67, 85, 58

[56] References Cited

U.S. PATENT DOCUMENTS

| | | | |
|---|---|---|---|
| 3,899,642 | 8/1975 | Jones et al. | 370/110.2 |
| 4,205,203 | 5/1980 | Mehta et al. | 370/110.2 |
| 4,227,248 | 10/1980 | Munter | 370/110.2 |
| 4,399,535 | 8/1983 | Southard | 370/110.2 |
| 4,480,330 | 10/1984 | Magnusson et al. | 370/110.2 |

FOREIGN PATENT DOCUMENTS

| | | |
|---|---|---|
| 037111 | 3/1980 | European Pat. Off. . |
| 037540 | 3/1980 | European Pat. Off. . |
| 1402827 | 8/1975 | United Kingdom . |
| 1567993 | 5/1980 | United Kingdom . |

Primary Examiner—Douglas W. Olms
Assistant Examiner—Curtis Kuntz
Attorney, Agent, or Firm—Dennis P. Clarke

[57] ABSTRACT

In a digital PCM-TDM telephone exchange, supervisory tones needed are centrally generated by a digital synthesizer. This includes a PROM (1) in which PCM codes for the tones needed are stored in successive memory locations. The tones used are the DR tone, which is a mixture of 350 Hz and 440 Hz, and the BN tone, which is 400 Hz. These are read out under clock pulse control (5-6-7) such that the DR tone bytes are read out at time slot 0 and the BN tone bytes are read out at time slot 1. They are then sent over a common intelligence bus (4) to all line and trunk interfaces.

At each such interface the tone bytes are converted to analogue form so as to be continuously available. The tone (or tones) to be used is (or are) selected in response to instructions from the central control each of which specifies a program in the interface's processor. Such a program controls both the selection of the tone (or tones) needed, and the cadence (continuous, or interrupted in a defined manner).

8 Claims, 2 Drawing Figures

TONE GENERATION CIRCUIT FOR AUTOMATIC PCM-TDM TELECOMMUNICATION EXCHANGE

BACKGROUND AND SUMMARY OF THE INVENTION

This invention relates to an automatic telephone exchange in which the tone generation is at least partly centralised.

According to the invention, there is provided an automatic telephone exchange, which includes a centrally-located tone generation means which generates tones at a plurality of different frequencies, connections from the generation means to the terminal interfaces for all lines served by the exchange, a central control arrangement for the telephone exchange, and processor means associated with each of said interfaces and adapted to respond to signals from the central control arrangement to apply to a line served by that interface any one of the tones needed by that line, the signals thus applied to the interface controlling both the selection of the tone or tones to be used and the cadences with which the selected tone or tones is or are applied to the appropriate line.

BRIEF DESCRIPTION OF THE DRAWINGS

An embodiment of the invention will now be described with reference to the accompanying highly schematic block diagrams in, which

DESCRIPTION OF THE PREFERRED EMBODIMENT

The tone generation arrangement is described as applied to a telephone exchange of the type described and claimed in copending, commonly assigned application Ser. No. 538,273, filed Oct. 3, 1983. However, the principles of the arrangement described herein can be applied in other forms of telephone exchanges.

Figure 1:
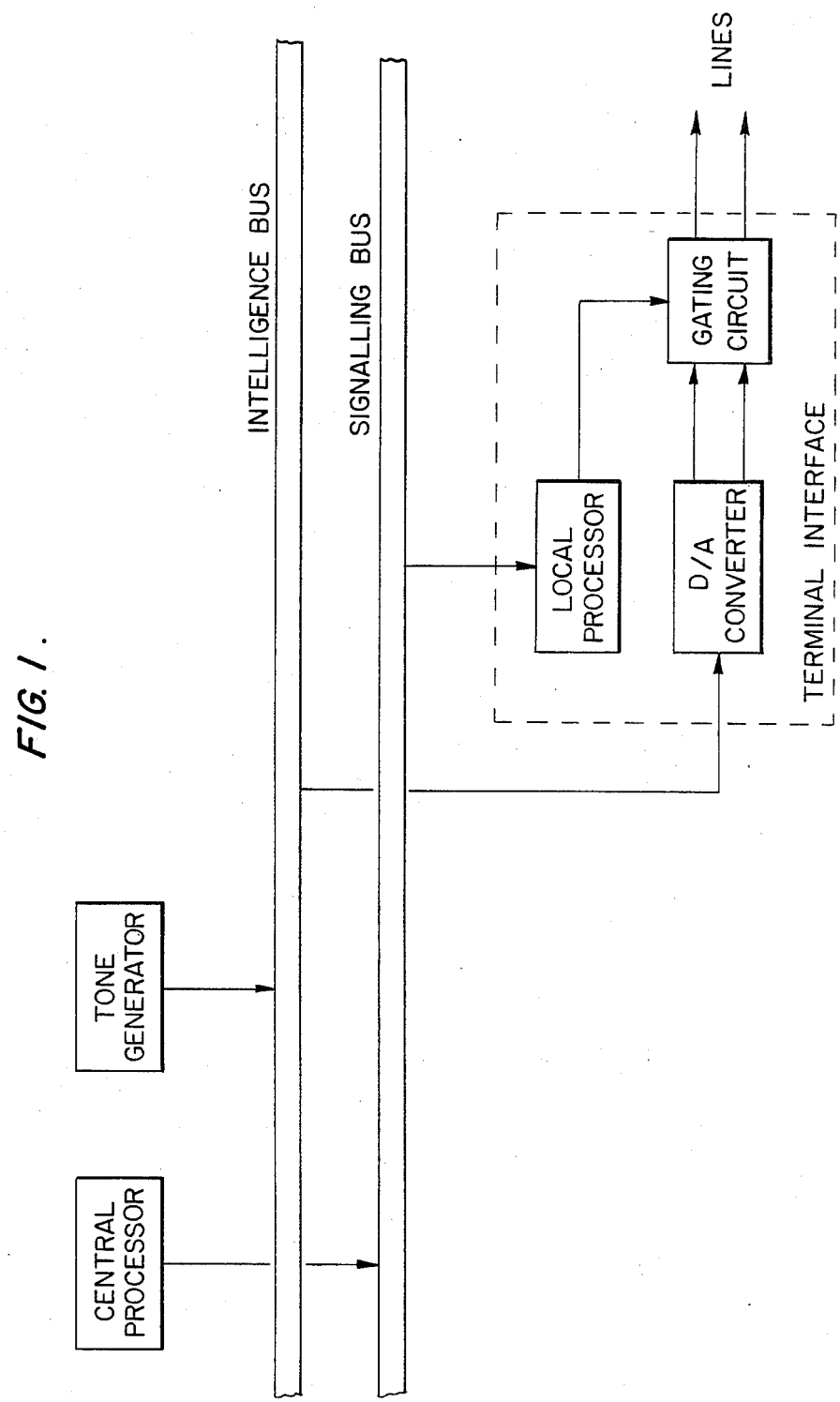
FIG. 1 shows an automatic telephone exchange and FIG. 2 shows the centralised portion of the telephone exchange tone generation arrangement embodying the invention.

The above-mentioned telephone exchange is a small "business-type" telephone exchange, in which calls are set up in TDM manner using PCM to convey speech, and also data if the exchange serves any data terminals. As shown in FIG. 1, it has subscriber line ports each of which serves two subscriber lines and a smaller number of trunk line ports each of which serves a trunk to a local exchange. Each port, which is also referred to herein as a terminal interface, has a local processor with, in the case of analogue lines and trunks, analogue-to-digital (A/D) and digital-to-analogue (D/A) conversion circuitry. Where a line or trunk is of the digital type, naturally no conversion circuitry is needed. The exchange also has a central processor, with its associated memories.

The ports and the central processor and interconnected by an intelligence bus and a signalling bus. The central processor and the port processors co-operate in call setting with all communications between the processors being over the signalling bus. During operation the central processor polls the ports via the signalling bus for ports needing the services of the central processor and also to pass call control information to those ports.

To set up a call between two lines, or a line and a trunk, two time slots in the TDM cycle are allocated to the call by the central processor, one for each direction of transmission. The intelligence bus is thus used only to convey intelligence, i.e. speech and/or data and tones.

The tones needed in the exchange are all produced from a centrally located electronic tone generator (shown in more detail in FIG. 2) using digital techniques. This tone generator produces two base tones, one, called the DR tone, consisting of two notes with frequencies of 350 Hz and 440 Hz mixed together, and the other, called the BN tone, consisting of a single note of 400 Hz. These tones are distributed via the PCM bus (intelligence bus) referred to above, the DR tone occupying time slot 0 in the PCM frame and the BN tone occupying time slot 1.

At each of the ports or interfaces referred to above, both the subscriber line ports and the trunk line ports, the digital to analogue circuitry extracts and decodes the DR and the BN tone. Hence at each of these interfaces the two tones are available in effect as continuous tones. The tones to be produced by each interface consist of one or more of the DR and BN tones, either as continuous tones or as tones interrupted according to a defined cadence which are used for supervisory purposes. The derivation of the tones as heard by the subscriber is done by the ports' processors, under control of instructions from the central processor. Thus when a given supervisory tone is needed for a line or trunk the appropriate port processor receives an instruction from the central processor over the signalling bus as a result of which it produces the required tone from the distributed DR and BN tones.

The supervisory tones provided in the present arrangement are as follows:
(a) Dial Tone is the DR tone applied continuously
(b) Busy Tone is the BN tone applied with a cadence of 375 ms on, 375 ms off
(c) Ring Tone is the DR tone applied with a cadence of 0.75 sec on and 2.25 sec off
(d) Number Unobtainable Tone is the BN tone applied continuously
(e) Warning Tone which is applied when operator or executive intervention is in operation, is the BN tone applied with a cadence of 200 ms on and 200 ms off.

Figure 2:
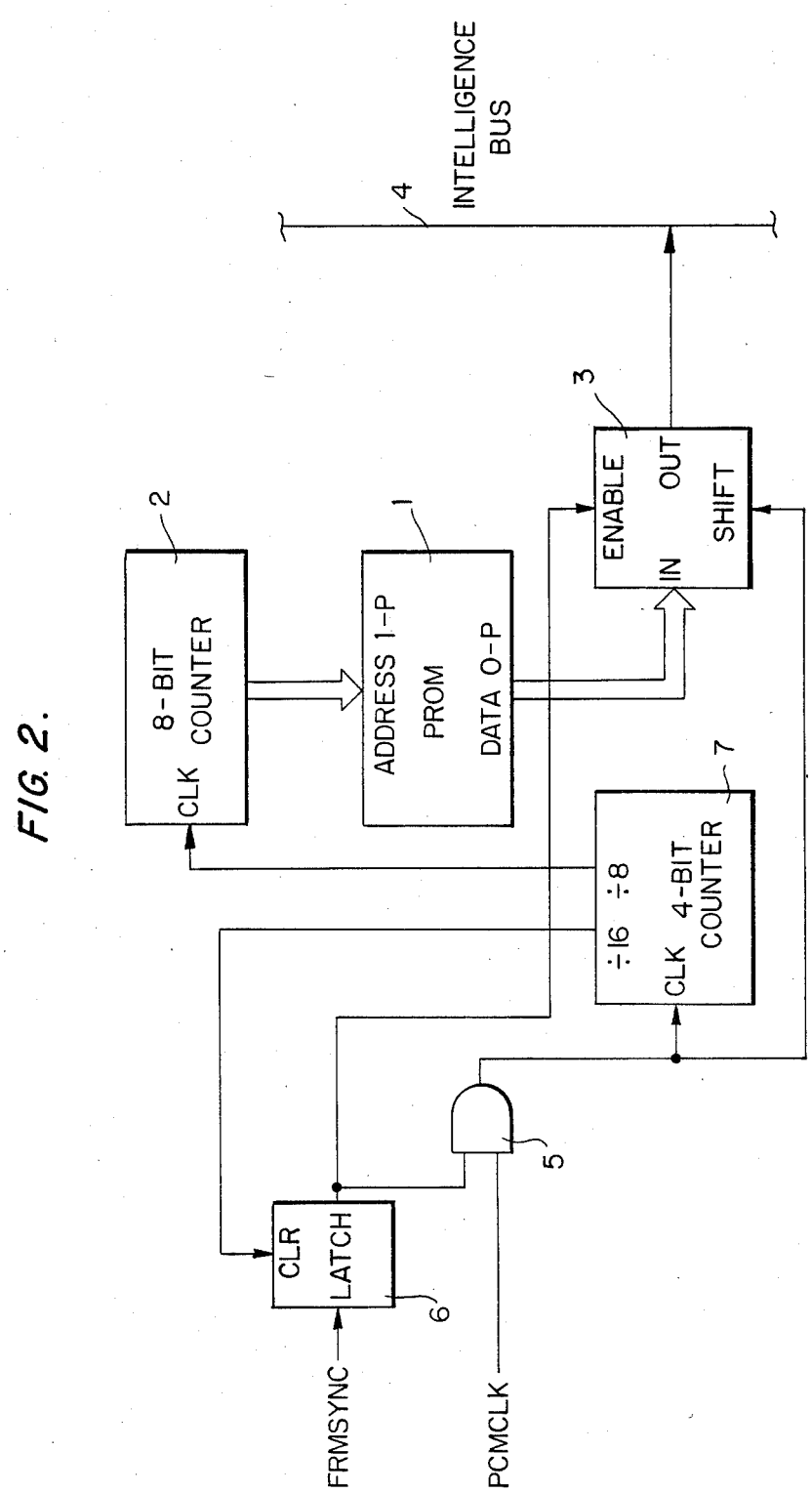

The generation of the BN and DR tone is effected in the manner shown in the accompanying FIG. 2. Digital PCM representations of these two basic tones are stored in alternate locations of a bipolar PROM (Programmable Read Only Memory) 1. This PROM is controlled by an 8-bit sequence counter 2 which counts through the range of addresses of the PROM 1 needed to generate one cycle of each of the tones. The parallel output from the PROM 1 is connected to a parallel-in-serial-out (PISO) shift register 3, which provides parallel-to-serial conversion for application of the PCM to the intelligence bus 4. As already mentioned, this bus distributes the basic BN and DR tones to all of the interfaces at which they are needed.

The shift register 3 is clock pulse controlled by the PCM clock via a gate 5, this clock (PCM clock) occurring at the PCM bit rate. The other clock input FRMSYNC defines the commencement of the PCM frame and sets a latch 6 which opens gate 5 for a period dependent on the time for which the latch is set. This time is two time slots long, i.e., divide (÷) by 16 bit times, defined by a −16 output from the four bit counter 7.

Thus the shift register 3 is controlled by a clock circuit comprising circuit elements 5-6-7, which generates 16 pulses at the PCMCLK rate following every FRMSYNC pulse received. The pulses from the counter 7 are divided by 8 to drive the sequence counter 2, which ensures that a byte of each tone sequence is latched into the shift register 3 after each FRMSYNC pulse. Thus the time slots 0 and 1 will each contain 8 bits of PCM code for the two base tones.

At a port the digital-to-analogue conversion circuitry decodes the two base tones, each at its own time slot so that these tones are each continuously available at that port. When one of the supervisory tones listed above is needed in the course of call setting and control, the central processor sends an instruction over the exchange's signalling bus to the interface for the line or trunk needing it. This instruction is received by the line's or trunk's processor, which therefore enables one of a set of tone control programmes. Each such program controls gates from the outputs of the digital-to-analogue converter in a manner appropriate to the tone wanted.

Thus, for instance, for the dial tone, a gate between the converter output for the DR tone is opened continuously until a cut-off instruction is received. In the case of dial tone, this occurs in response to the caller commencing to dial or key in the wanted number, or if he hangs up without "dialling".

To quote another example, for the ring tone, the BN output from the converter is enabled for 375 ms on and disabled for 375 ms off for as long as needed.

Each such controlling sequence uses a relatively simple program in the port's processor.

If it was inconvenient for any reason to centrally generate a mixed tone such as the DR tone, the frequencies which make up that tone could be separately generated at the centralised generation point. In such case these tones would be sent out separately, i.e. in the arrangement described on separate time slots of the TDM cycle. Mixing then occurs at the interfaces, at the digital-to-analogue converter outputs.

I claim:

1. An automatic telephone exchange, comprising a plurality of terminal interfaces serving subscriber and trunk lines, each interface being connected to a common intelligence bus on which speech and other intelligence is conveyed in TDM manner using PCM and to a common signalling bus, and each interface having a local processor connected to the signalling bus; a central processor connected to the signalling bus for supplying control signals to the local processors of the terminal interfaces; and centrally-located tone generation means for generating tones at a plurality of different frequencies and for supplying the tone to the terminal interfaces for all lines served by the exchange over the common intelligence bus, the tones being conveyed in predetermined time slots of a TDM cycle so as to be available substantially continuously at the terminal interfaces, and the local processor of each of said interfaces being formed to respond to the control signals conveyed from the central processor over the signalling bus so as to apply to a line served by that interface any one or more of the tones needed by that line for supervisory purposes, the local processor controlling in response to the control signals both the selection of a tone or tones to be used and the cadences, if any, with which the selected tone or tones are applied to the line.

2. An exchange as claimed in claim 1, wherein the tone generation means comprises a memory for storing PCM code bytes representative of each of the tones, and means for reading the bytes successively from the memory in which they are stored to produce PCM codes for the tones.

3. An exchange as claimed in claim 2, wherein one of the tones thus generated consists of two different frequencies mixed.

4. An automatic telecommunications exchange in which speech and other intelligence and conveyed in TDM manner using PCM, comprising a plurality of terminal interfaces interconnected via a common intelligence bus and a common signalling bus, each terminal interface serving subscribers' lines served by the exchange and each said terminal interface including local processing means connected to the common signalling bus; centrally-located tone generation means for generating tones and for supplying the tones to the terminal interfaces via the common intelligence bus with each said tone being conveyed in a predetermined time slot of a TDM cycle; a central control processor for producing control signals which are sent via the signalling bus to the local processing means of a terminal interface serving a line requiring a supervisory tone, the supervisory tone comprising one or more continuous or varying ones of the tones, which control signals represent both the selection of the tone or tones carried on the intelligence bus and the cadences of the selected tone or tones required for said supervisory tone, and in which in response to such control signals the local processing means selects from the intelligence bus the required tone or tones to be applied to the line and controls the cadence of the selected tone or tones as called for by the control signal.

5. An exchange as claimed in claim 2, wherein each terminal interface comprises a digital-to-analogue converter for converting the PCM codes to continuous analogue tones, and gating means connected to the digital-to-analogue converter and controlled by the local processor of the terminal interface for selecting the tone or tones needed by the line and for controlling the cadences, if any, of the selected tones.

6. An exchange as claimed in claim 5, wherein the local processor embodies control programs for controlling the gating means in response to the control signals from the central processor.

7. An exchange as claimed in claim 2, wherein said PCM code bytes are stored in said memory at successive addresses, and wherein said reading means comprises a sequence counter which counts through a range of addresses corresponding to one cycle of each of the tones to read from the memory the PCM code bytes, a parallel-to-serial converter for receiving the code bytes read from the memory and for impressing the code bytes onto the intelligence bus as serial PCM codes, and a clock circuit for controlling the sequence counter and the parallel-to-serial converter such that the PCM codes are impressed upon the intelligence bus in said predetermined time slots.

8. An automatic PCM-TDM telecommunication exchange comprising a plurality of terminal interfaces, each serving one or more lines and being connected to a common intelligence bus on which speech and other intelligence is conveyed in TDM manner using PCM, and each terminal interface having a local processor connected to a common signalling bus; a central control processor connected to the signalling bus for conveying control information to the local processors of the terminal interfaces; a tone generator for producing PCM codes representative of a plurality of different tones and for impressing the PCM codes on the intelligence bus in predetermined time slots of a TDM cycle; digital-to-analogue converter means at each terminal interface for converting the PCM codes to their corresponding analogue tones; and gating means at each terminal interface receiving the analogue tones from the digital-to-analogue converter means, the gating means at each terminal interface being controlled by the local processor at such interface in response to control information from the central processor such that the gating means supplies to a line served by the interface one or more selected tones and controls the cadences of the selected tones.

* * * * *